US009347666B2

(12) United States Patent
Nakamura et al.

(10) Patent No.: US 9,347,666 B2
(45) Date of Patent: May 24, 2016

(54) COMBUSTOR WITH FUEL INJECTOR PEGS FOR REDUCING COMBUSTION PRESSURE OSCILLATIONS

(71) Applicant: MITSUBISHI HEAVY INDUSTRIES, LTD., Tokyo (JP)

(72) Inventors: Sosuke Nakamura, Tokyo (JP); Yoshikazu Matsumura, Tokyo (JP); Hikaru Katano, Tokyo (JP); Katsunori Tanaka, Tokyo (JP); Koichi Nishida, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 786 days.

(21) Appl. No.: 13/727,283

(22) Filed: Dec. 26, 2012

(65) Prior Publication Data

US 2015/0226434 A1 Aug. 13, 2015

(30) Foreign Application Priority Data

Jan. 5, 2012 (JP) ................................. 2012-000605

(51) Int. Cl.
*F23R 3/28* (2006.01)
*F23R 3/14* (2006.01)
(Continued)

(52) U.S. Cl.
CPC ... *F23R 3/28* (2013.01); *F02C 3/14* (2013.01); *F23R 3/10* (2013.01); *F23R 3/14* (2013.01);
(Continued)

(58) Field of Classification Search
CPC .............. F23R 3/28; F23R 3/286; F23R 3/20; F23R 3/54; F02C 3/145; F05B 2260/96; F05B 2260/962; F05B 2260/966; F23D 2210/00
USPC ............................ 60/746, 758, 760, 724, 725
See application file for complete search history.

(56) References Cited

U.S. PATENT DOCUMENTS 5,943,866 A * 8/1999 Lovett et al. .................... 60/737
6,412,282 B1 * 7/2002 Willis ............................. 60/737
(Continued)

FOREIGN PATENT DOCUMENTS

CN 101203668 A 6/2008
CN 101586812 A 11/2009
(Continued)

OTHER PUBLICATIONS

Office Action dated Feb. 2, 2015, issued in corresponding Chinese Patent Application No. 201280060223.6, with English translation (10 pages).
(Continued)

*Primary Examiner* — Ehud Gartenberg
*Assistant Examiner* — Thomas Burke
(74) *Attorney, Agent, or Firm* — Westerman, Hattori, Daniels & Adrian, LLP

(57) ABSTRACT

A combustor includes a combustor external cylinder, a tubular combustor basket installed in the combustor external cylinder, a compressed air channel defined between the combustor external cylinder and the combustor basket, and a plurality of fuel nozzles installed in the combustor basket. Compressed air flowing along the compressed air channel is approximately reversed in the flow direction at an end of the combustor basket, and is introduced into the plurality of fuel nozzles. Fuel injection pegs made up of an upstream side fuel injection peg injecting upstream side fuel and a downstream side fuel injection peg injecting downstream side fuel, are installed in the compressed air channel. Concentration fluctuation of the upstream side fuel caused by pressure fluctuation in the combustor is configured so as to reduce a peak of concentration fluctuation of the downstream side fuel at a combustion start position of the combustor.

12 Claims, 4 Drawing Sheets

(51) Int. Cl.
*F23R 3/34* (2006.01)
*F23R 3/36* (2006.01)
*F02C 3/14* (2006.01)
*F23R 3/46* (2006.01)
*F23R 3/54* (2006.01)
*F23R 3/10* (2006.01)

(52) U.S. Cl.
CPC . *F23R 3/286* (2013.01); *F23R 3/34* (2013.01); *F23R 3/36* (2013.01); *F23R 3/46* (2013.01); *F23R 3/54* (2013.01); *F23R 2900/00013* (2013.01)

(56) References Cited

U.S. PATENT DOCUMENTS

| | | | |
|---|---|---|---|
| 7,610,746 B2* | 11/2009 | Fujii et al. | 60/39.281 |
| 8,919,125 B2* | 12/2014 | Belsom | 60/737 |
| 2004/0050057 A1* | 3/2004 | Bland | F23D 14/82 60/737 |
| 2005/0268617 A1 | 12/2005 | Amond et al. | |
| 2008/0155987 A1 | 7/2008 | Amond et al. | |
| 2009/0125207 A1 | 5/2009 | Nomura et al. | |
| 2009/0223228 A1* | 9/2009 | Romoser | 60/776 |
| 2011/0016873 A1 | 1/2011 | Nakamura et al. | |
| 2011/0056180 A1 | 3/2011 | Nomura et al. | |
| 2011/0098847 A1 | 4/2011 | Spitzig et al. | |
| 2011/0172893 A1 | 7/2011 | Nomura et al. | |
| 2012/0085100 A1* | 4/2012 | Hughes et al. | 60/776 |
| 2012/0279223 A1* | 11/2012 | Barker et al. | 60/740 |
| 2013/0081400 A1* | 4/2013 | Rohrssen et al. | 60/772 |
| 2013/0139511 A1 | 6/2013 | Sometani et al. | 60/722 |
| 2013/0160423 A1* | 6/2013 | Wasif | F23R 3/26 60/39.23 |
| 2013/0213051 A1* | 8/2013 | Westmoreland, III | F23R 3/36 60/775 |
| 2014/0366541 A1* | 12/2014 | Jensen | F02C 7/22 60/734 |

FOREIGN PATENT DOCUMENTS

| | | |
|---|---|---|
| CN | 101672483 A | 3/2010 |
| CN | 101772628 A | 7/2010 |
| CN | 101999037 A | 3/2011 |
| EP | 2 372 245 A1 | 10/2011 |
| JP | 10-318541 A | 12/1995 |
| JP | 8-21627 A | 1/1996 |
| JP | 2001-289441 A | 10/2001 |
| JP | 2005-233574 A | 9/2005 |
| JP | 2006-183652 A | 7/2006 |
| JP | 2006-234377 A | 9/2006 |
| JP | 2007-77866 A | 3/2007 |
| JP | 4205199 B2 | 1/2009 |
| JP | 2009-281720 A | 12/2009 |
| JP | 2010-281568 A | 12/2010 |
| JP | 2011-111964 A | 6/2011 |
| WO | 2010/038528 A1 | 4/2010 |
| WO | 2010/061646 A1 | 6/2010 |

OTHER PUBLICATIONS

International Search Report of PCT/JP2012/083501, date of mailing Mar. 19, 2013 (with English translation).
Extended European Search Report dated Jul. 23, 2015, issued in counterpart European application No. 12864068.7. (7 pages).
Office Action dated Oct. 6, 2015, issued in corresponding Japanese Patent Application No. 2012-000605, with English translation (8 pages).

* cited by examiner

COMBUSTOR WITH FUEL INJECTOR PEGS FOR REDUCING COMBUSTION PRESSURE OSCILLATIONS

FIELD OF THE INVENTION

The present invention relates to a combustor of, for instance, a gas turbine.

This application claims priority to and the benefits of Japanese Patent Application No. 2012-000605 filed on Jan. 5, 2012, the disclosure of which is incorporated herein by reference.

BACKGROUND ART

In industrial gas turbines recently used in thermal power plants or the like, there is a demand to ensure high power, high efficiency, and low NOx (nitrogen oxide). According to this demand, the following low NOx type combustor is employed as a combustor constituting the gas turbine.

For example, in Patent Document 1 below, a combustor having a combustor basket that is connected to an inlet of combustion gas of a turbine, burns fed fuel, and feeds generated combustion gas to the turbine, a pilot nozzle that is disposed in the center of the combustor basket, and injects the fuel into the combustor basket to form a diffusion flame, and a plurality of main premixing nozzles that are disposed around the pilot nozzle, inject a pre-mixture of compressed air and the fuel into the combustor basket, and ignite the pre-mixture to form a premixed flame by the diffusion flame is disclosed.

That is, in diffusion combustion caused by the pilot nozzle, since a local fuel-air ratio is relatively high in the combustion, combustion stability is good, but an amount of production of NOx is increased by high-temperature combustion. On the other hand, in premixing combustion caused by the main premixing nozzles, a uniform fuel-air ratio is accomplished, and thus the amount of production of NOx can be reduced by low-temperature combustion. In other words, in the combustor of Patent Document 1 below, a stable diffusion flame is formed, and the pre-mixture is ignited by this diffusion flame. Thus, the low NOx and relatively high combustion stability are compatible.

However, although the above-mentioned premixing combustion system is seemingly excellent in reduction of NOx, it easily causes combustion oscillation. The combustion oscillation is a phenomenon in which pressure fluctuation generated in the combustor by combustion and heat-generation fluctuation generated by temporal variation in fuel concentration caused by a nozzle part are synchronized at a combustion position, thereby oscillating. The combustion oscillation makes combustion unstable, and this makes it impossible to stably operate the combustor. As such, there is a need to prevent the combustion oscillation from being generated as much as possible.

As the combustor suppressing this combustion oscillation, there is a combustor as disclosed in Patent Document 2. In this combustor, main premixing nozzles injecting a pre-mixture are installed, for instance, in a plurality of sets, and then the plurality of sets of main premixing nozzles are alternately arranged in an axial direction. On the other hand, the pre-mixture injected from the main premixing nozzles is accompanied with the heat-generation fluctuation. The plurality of sets of main premixing nozzles are arranged in a positional relation in which the heat-generation fluctuations of fuel injected from the respective main premixing nozzles offset each other. Thereby, the heat-generation fluctuations are offset, and the combustion oscillation is reduced.

RELATED ART DOCUMENTS

Patent Documents

[Patent Document 1] Japanese Unexamined Patent Application, First Publication No. 2001-289441

[Patent Document 2] Japanese Unexamined Patent Application, First Publication No. 2009-281720

DISCLOSURE OF THE INVENTION

Problems to be Solved by the Invention

However, a ratio of fuel and air mixed by the main premixing nozzles is set so as to be higher than an inflammability limit. As such, in the case of the combustor of Patent Document 2 above, there is a high possibility of flashback (backfire) occurring. That is, in the combustor disclosed in Patent Document 2 above, when the main premixing nozzles are arranged so as to offset the heat-generation fluctuations with each other, a distance between the two main premixing nozzles which is calculated based on a flow rate of the compressed air and a period of the heat-generation fluctuations is at least 100 mm. As described above, since the interior of the combustor basket in which the main premixing nozzles are installed is in a state of high flammability, it is difficult to avoid the flashback. Further, the pre-mixture of fuel and air mixed by the main premixing nozzles is maintained at a high flow rate, and depending on a target frequency of the combustion oscillation, an interval between the main premixing nozzles is required to be considerably great.

The present invention has been made taking these circumstances into consideration, and an object of the present invention is to provide a combustor that prevents the occurrence of combustion oscillation, thereby allowing an operational tolerance (safe operation allowable range) of a gas turbine to be increased.

Means for Solving the Problems

To accomplish the above object, the present invention provides the following means.

According to a first aspect of the present invention, there is provided a combustor, which includes: a combustor external cylinder; a tubular combustor basket installed in the combustor external cylinder; a compressed air channel defined between an inner circumferential surface of the combustor external cylinder and an outer circumferential surface of the combustor basket; and a plurality of fuel nozzles installed in the combustor basket, extending approximately in parallel with a central axis of the combustor basket, and injecting fuel for premixing combustion from at least one thereof. Compressed air flowing along the compressed air channel is approximately reversed in the flow direction at an end of the combustor basket, and is introduced into the plurality of fuel nozzles. Fuel injection pegs, each of which is made up of an upstream side fuel injection peg injecting upstream side fuel and a downstream side fuel injection peg injecting downstream side fuel, are installed in the compressed air channel. Concentration fluctuation of the upstream side fuel caused by pressure fluctuation in the combustor is configured so as to reduce a peak of concentration fluctuation of the downstream side fuel at a combustion start position of the combustor.

According to the above configuration, heat-generation fluctuation at a flame position caused by the concentration fluctuation of the downstream side fuel is offset by heat-generation fluctuation at a flame position caused by the concentration fluctuation of the upstream side fuel. As such, the occurrence of the combustion oscillation can be suppressed. Thereby, the operational tolerance of a gas turbine having the combustor can be increased.

Further, according to a second aspect of the present invention, in the combustor according to the first aspect of the present invention, it is preferable that a distance between the upstream side fuel injection peg and the downstream side fuel injection peg is set so that a phase of the concentration fluctuation of the upstream side fuel is opposite to a phase of the concentration fluctuation of the downstream side fuel at a position where the upstream side fuel reaches the downstream side fuel injection peg.

According to the above configuration, since the position of the upstream side fuel injection peg can be determined based on the phase of the concentration fluctuation, the occurrence of combustion oscillation can be more strictly suppressed.

Further, according to a third aspect of the present invention, in the combustor according to the first or second aspect of the present invention, it is preferable that a ratio of fuel and air mixed by the fuel injection pegs is set so as to be lower than an inflammability limit.

According to the above configuration, occurrence of flashback (backfire) is more reliably prevented, and thereby the combustion oscillation can be suppressed.

Further, according to a fourth aspect of the present invention, in the combustor according to any one of the first to third aspects of the present invention, it is preferable that the plurality of fuel nozzles include a pilot nozzle installed on a central axis of the combustor basket, and premixing nozzles extending approximately in parallel with the pilot nozzle and installed in the combustor basket at intervals at which central angles thereof are equal to one another.

Further, according to a fifth aspect of the present invention, in the combustor according to any one of the first to third aspects of the present invention, the at least one of the plurality of fuel nozzles may include both a fuel injection hole for premixing combustion and a fuel injection hole for diffusion combustion.

Effects of the Invention

According to the combustor, since the heat-generation fluctuation at the flame position caused by the concentration fluctuation of the downstream side fuel is offset by the heat-generation fluctuation at the flame position caused by the concentration fluctuation of the upstream side fuel, the occurrence of the combustion oscillation can be suppressed. Thereby, the operational tolerance of the gas turbine having the combustor can be increased.

MODES FOR CARRYING OUT THE INVENTION

Hereinafter, an embodiment of the present invention will be described in detail with reference to the accompanying drawings.

Figure 1:
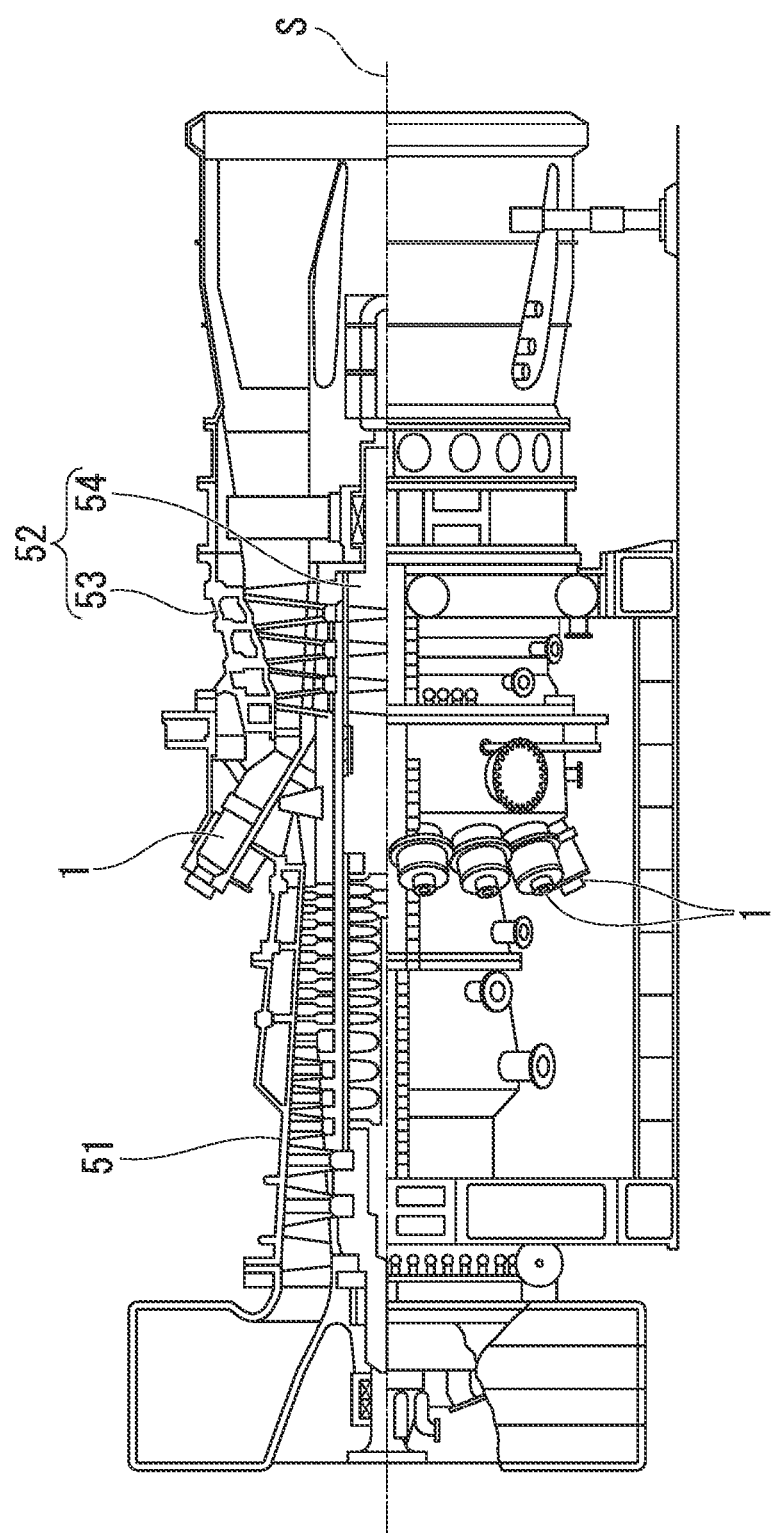
FIG. 1 is a view showing a schematic overall configuration of a gas turbine according to an embodiment of the present invention, and particularly a half cross-sectional view of the gas turbine.

As shown in FIG. 1, a gas turbine of the present embodiment includes a compressor 51 compressing external air to produce compressed air, a plurality of combustors 1 mixing fuel from a fuel supply source with the compressed air and burning the fuel-air mixture to produce combustion gas, and a turbine 52 driven by the combustion gas.

The turbine 52 is equipped with a casing 53 and a turbine rotor 54 rotated in the casing 53. The turbine rotor 54 is connected to, for instance, a generator (not shown) generating electricity by the rotation of the turbine rotor 54. The plurality of combustors 1 are fixed to the casing 53 around a rotational axis S of the turbine rotor 54 at regular intervals in a circumferential direction.

Figure 2:
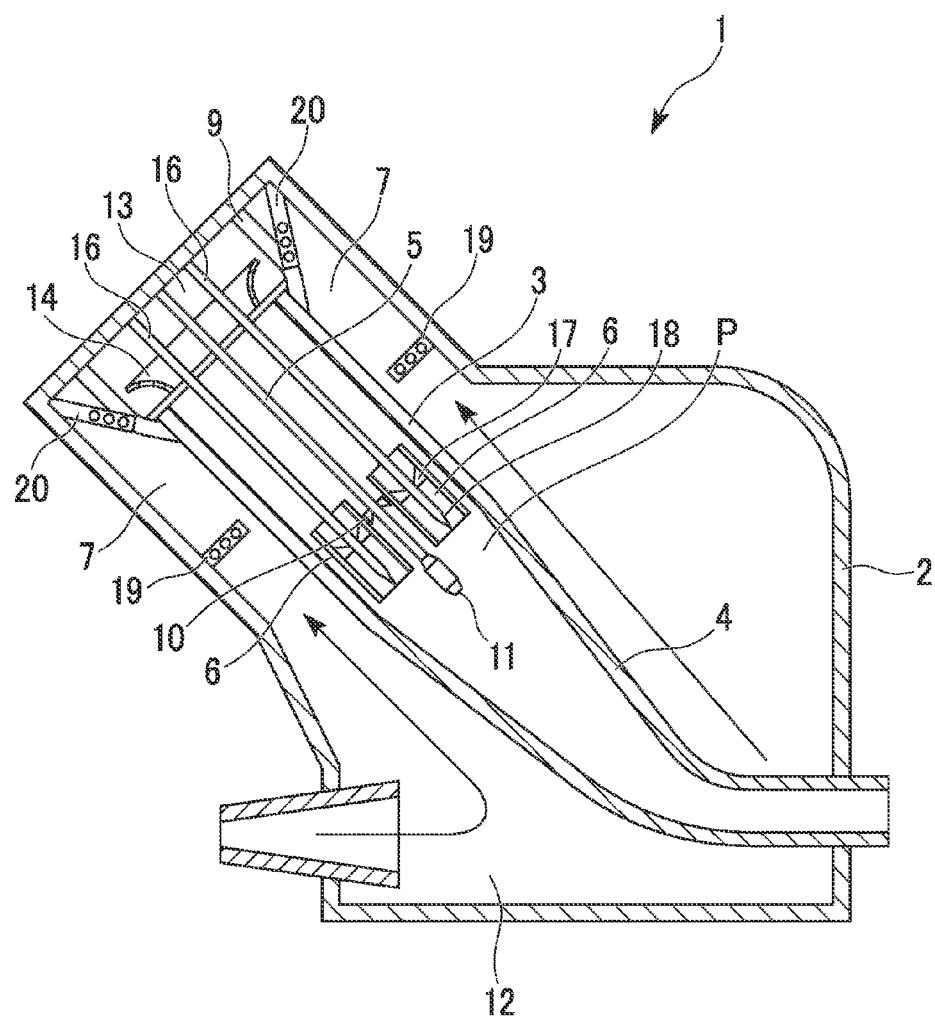
FIG. 2 is a cross-sectional view of a combustor according to the embodiment of the present invention.
Figure 3:
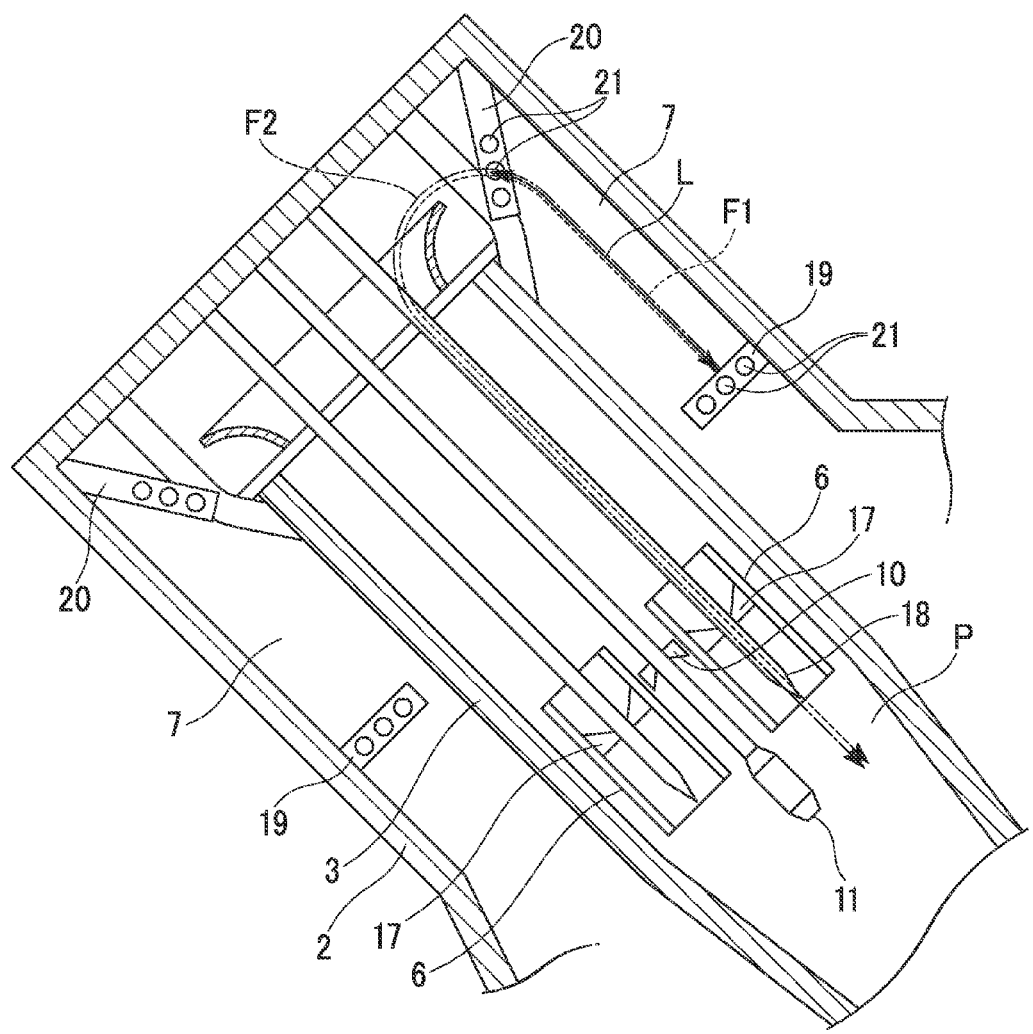
FIG. 3 is a partial enlarged view of FIG. 2.

As shown in FIGS. 2 and 3, the combustor 1 of the present embodiment includes a combustor external cylinder 2, a tubular combustor basket 3 installed in the combustor external cylinder 2, a combustion liner 4 connected with the combustor basket 3, a pilot nozzle 5 installed on the central axis of the combustor basket 3, and a plurality of main premixing nozzles 6 arranged around the pilot nozzle 5. A fuel nozzle of the present embodiment is constituted of the pilot nozzle 5 and the main premixing nozzles 6.

The combustor external cylinder 2 houses the combustor basket 3 so as to be coaxial with the combustor external cylinder 2, and a compressed air channel 7 that is a channel of the compressed air (air for combustion) is defined between the combustor external cylinder 2 and the combustor basket 3. That is, the compressed air channel 7 is defined between an inner circumferential surface of the combustor external cylinder 2 and an outer circumferential surface of the combustor basket 3. Further, the combustor basket 3 is fixed to a stay 9 at one end thereof, and is coupled to the combustion liner 4 at the other end thereof.

The pilot nozzle 5 has pilot swirl vanes 10 disposed therearound. A leading end of the pilot nozzle 5 is formed with a fuel injection hole 11 that injects the fuel.

The leading end of the pilot nozzle 5 forms a pilot diffusion flame. A fuel-air mixture injected from the main premixing nozzles 6 is sent to the combustion liner 4, is brought into contact with the pilot diffusion flame to form a main flame, and is burnt. The combustion gas after being burnt is introduced into the turbine.

The combustor external cylinder 2 is provided with an air suction part 12 for supplying the air compressed by the compressor. The compressed air channel 7 is connected downstream from the air suction part 12. Furthermore, to change a direction in which the air flowing in from the compressed air channel 7 flows at an angle of about 180°, an airflow introduction part 13 is installed adjacent to an end of the combustor basket 3 which is located on the opposite side of the side on which the combustion liner 4 is connected. The airflow introduction part 13 is provided with a turnabout member 14 having a semicircular cross section.

Each main premixing nozzle 6 is provided with a main fuel rod 16 supplying the fuel. In each main premixing nozzle 6, premixing swirl vanes 17 for obtaining a swirl flow generated by swirling an air flow flowing to the main premixing nozzle 6 around the main fuel rod 16 are provided. Further, a main fuel injection hole 18 extending from the main fuel rod 16 to a radial outer side is provided downstream from the premixing swirl vanes 17.

Alternatively, the main premixing nozzle 6 may be configured so that, instead of the main fuel injection hole 18 provided in the main fuel rod 16, a fuel passage is formed in the premixing swirl vane 17, and the fuel is injected from a surface of the premixing swirl vane 17.

The pilot nozzle 5 and the main fuel rods 16 of the main premixing nozzles 6 pass through an end of the combustor external cylinder 2 of the combustor 1, and the fuel is supplied from the outside of the combustor 1.

The compressed air channel 7 includes a plurality of first fuel injection pegs 19 (e.g. 16 first fuel injection pegs) that extend from the combustor external cylinder 2 to a radial inner side and are disposed at intervals at which central angles thereof are equal to one another, and a plurality of second fuel injection pegs 20 (e.g. 16 second fuel injection pegs) that extend from the combustor external cylinder 2 to the radial inner side downstream from the first fuel injection pegs 19 in the flowing direction of the airflow and are disposed at intervals at which central angles thereof are equal to one another. The first fuel injection peg 19 and the second fuel injection peg 20 are each provided with a plurality of fuel injection holes 21 for injecting the fuel. With respect to a direction from the upstream side fuel injection peg to the downstream side fuel injection peg, the downstream side fuel injection peg forms an acute angle with respect to the combustor external cylinder and an obtuse angle with respect to the tubular combustor basket.

The first fuel injection pegs 19 and the second fuel injection pegs 20 are also called top hat nozzles, and are thus disposed farther upstream from the fuel nozzle. Further, a fuel-air mixture caused by the first and second fuel injection pegs 19 and 20 is set so as to be thinner than inflammability limiting concentration (or ignition limiting concentration). The inflammability limiting concentration refers to a concentration limit of fuel gas below which the fuel gas cannot be burnt (or ignited).

Hereinafter, the fuel supplied from the first fuel injection pegs 19 is referred to as first fuel F1, and the fuel supplied from the second fuel injection pegs 20 is referred to as second fuel F2.

A constant amount of fuel is injected from the first and second fuel injection pegs 19 and 20. On the other hand, since an entire interior of the combustor 1 is subjected to pressure fluctuation, the first fuel F1 and the second fuel F2 flow along the compressed air channel 7 as fuel concentration waves in which the concentration fluctuates at fixed periods. A frequency of concentration fluctuation of the fuel is decided by a frequency of the pressure fluctuation.

As described above, the concentrations of the first fuel F1 and the second fuel F2 fluctuate periodically. Thereby, heat-generation fluctuation is generated at a flame position P.

A distance L between the first fuel injection peg 19 and the second fuel injection peg 20 is determined as follows. In detail, the distance L is set in such a way that, at a position where the first fuel F1 injected from the first fuel injection peg 19 reaches the second fuel injection peg 20, a phase of the fuel concentration wave of the first fuel F1 is opposite to a phase of the fuel concentration wave of the second fuel F2, i.e. is out of phase by 180°. Hereinafter, this difference in phase, i.e. the retardation in phase when the fuel injected from the nozzle arrives with temporal delay, is referred to as a phase lag.

Hereinafter, a method of calculating the distance L will be described.

If a frequency of the concentration fluctuation (fuel concentration wave) is denoted by f (angular frequency $\omega$) and a time which it takes the first fuel F1 injected from the first fuel injection peg 19 to reach the second fuel injection peg 20 is denoted by $\Delta\tau$, the phase lag d can be calculated by Equation (1) below.

$$d = \omega \Delta\tau \quad (1)$$

Since the angular frequency $\omega$ is $2\pi f$, if a velocity of the compressed air is denoted by v, Equation (1) above can be transformed into Equation (2) below.

$$d = \omega \Delta\tau = 2\pi f \times L/v \quad (2)$$

That is, the distance L can be calculated by Equation (3) below.

$$L = d \times v / 2\pi f \quad (3)$$

Here, for example, if the velocity v of the compressed air is 50 m/s, and the frequency f is 100 Hz, the distance L with the phase lag set to 180° can be calculated as 250 mm. In case that the distance L is shorter than a length of the compressed air channel 7, i.e., when the installation is possible, the distance L can be employed.

Alternatively, a plurality of fuel injection holes 21 (e.g. six fuel injection holes) may be formed in the first fuel injection peg 19 and the second fuel injection peg 20.

Next, a description will be made of an operation of the combustor 1 of the present embodiment which is configured in this way.

An air flow of high-temperature, high-pressure compressed air compressed by the compressor 51 is supplied to the air suction part 12 of the combustor 1. Next, the compressed air is introduced into the compressed air channel 7. For the compressed air flowing into the compressed air channel 7, the first fuel F1 is injected from the first fuel injection pegs 19. Thereby, a very thin first fuel-air mixture of the compressed air and the fuel is formed. Then, the first fuel-air mixture flows to a farther downstream side of the compressed air channel 7, and the fuel is again injected at the second fuel injection pegs 20 and becomes a second fuel-air mixture.

The second fuel-air mixture turns a flow direction along the turnabout member 14 provided in the airflow introduction part 13, and flows into the combustor basket 3. A great part of the second fuel-air mixture flowing into the combustor basket 3 flows into the main premixing nozzles 6, and the rest of the second fuel-air mixture partially flows around the pilot nozzle 5.

The second fuel-air mixture flowing around the pilot nozzle 5 passes through the pilot swirl vanes 10. The second fuel-air mixture is then burnt in the combustion liner 4 along with the fuel injected from the fuel injection hole 11, and forms a pilot flame.

The second fuel-air mixture flows along the main fuel rods 16, and is mixed with main fuel in the main premixing nozzles 6, and thereby a third fuel-air mixture (fuel-air pre-mixture) is formed. The fuel-air pre-mixture passes through the premixing swirl vanes 17, thereby becoming a helical air flow to agitate the fuel and the air so as to be uniform. The fuel-air pre-mixture flowing into the combustion liner 4 from the main premixing nozzles 6 is brought into contact with a pilot diffusion flame, thereby forming a main flame.

Here, a description will be made of the pressure fluctuation of the combustor 1 and the heat-generation fluctuations of the first fuel F1 and the second fuel F2 at the flame position P.

Figure 4:
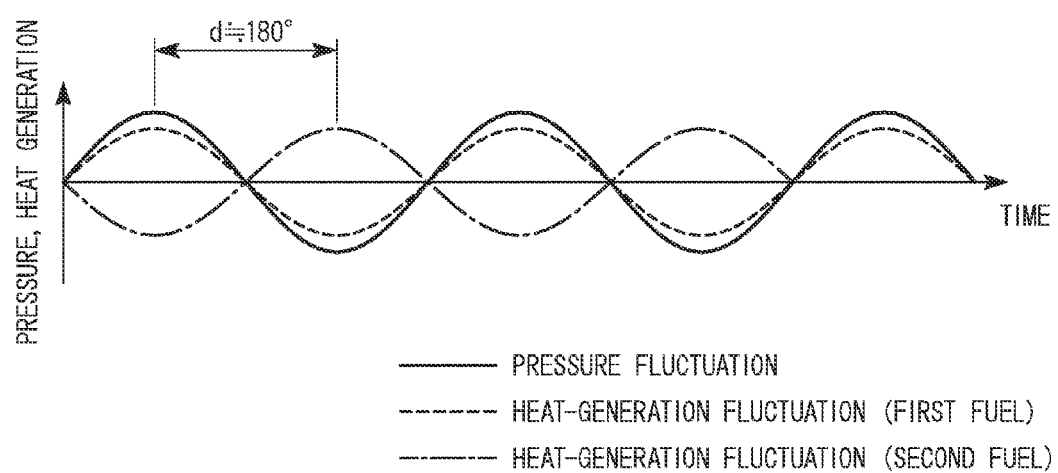
FIG. 4 is a graph showing heat-generation fluctuations of first and second fuel injection pegs, and a pressure fluctuation of the combustor.

As shown in FIG. 4, the heat-generation fluctuation of the first fuel F1 and the heat-generation fluctuation of the second fuel F2 at the flame position P vibrate together at fixed periods caused by the pressure fluctuation. Here, for example, the vibration of the first fuel F1 overlaps with the pressure fluctuation.

On the other hand, depending on the distance L between the first fuel injection peg 19 and the second fuel injection peg 20, the second fuel F2 has the opposite phase relative to the first fuel F1. Thereby, each heat-generation vibration at the flame position P has the opposite phase, i.e. is out of phase by about 180°.

According to the present embodiment, the second fuel-air mixture is produced by injecting the fuel from the first and second fuel injection pegs 19 and 20 installed in the compressed air channel 7 defined between the combustor external cylinder 2 and the combustor basket 3, and then is mixed with the fuel by the main premixing nozzles 6, thereby producing the fuel-air pre-mixture. Thereby, the amount of injection of the pilot fuel from the pilot nozzle 5 can be suppressed, and the flame stability can be maintained while avoiding the local high-temperature flame of the diffusion flame.

Further, the second fuel F2 has the opposite phase relative to the first fuel F1 at the flame position P. Thereby, the heat-generation vibration caused by the first fuel F1 and the heat-generation vibration caused by the second fuel F2 offset each other. As such, the combustion oscillation can be suppressed.

Further, in the compressed air channel 7, the ratio of the fuel and the air that are mixed by each of the fuel injection pegs 19 and 20 is set so as to be lower than the inflammability limit. As such, the occurrence of the flashback (backfire) is more reliably prevented, thereby the combustion oscillation can be suppressed.

Alternatively, the pilot nozzle 5 may be configured so that a fuel system for premixing combustion is installed, and a pilot flame is formed by the premixing combustion. In this case, on the basis of output of the gas turbine, an operation in which the pilot flame is formed only by the diffusion combustion, an operation in which the pilot flame is formed only by the premixing combustion, and an operation in which the diffusion combustion and the premixing combustion are used together are possible. For this reason, in a high load region of the gas turbine, a percentage of the pilot flame for the diffusion combustion is reduced, and a percentage of the pilot flame for the premixing combustion is increased. Thereby, it is possible to further reduce NOx. Further, if the pilot flame is formed only by the premixing combustion, NOx can be most reduced.

Further, in the present embodiment, the configuration in which the pilot nozzle 5 is provided on the central axis of the combustor basket 3 and in which the main premixing nozzles 6 extend approximately in parallel with the pilot nozzle 5 and are installed in the combustor basket 3 at intervals at which central angles thereof are equal to one another has been described. However, the configuration may be modified without departing from the sprit of the present invention.

For example, if the combustor has the fuel nozzle injecting the premixed fuel in the combustor basket, the present invention can be applied to the combustor. For example, the combustor may be configured to have a plurality of fuel rods, each of which has both fuel injection holes capable of being used in combination with premixing combustion and diffusion combustion and can switch the premixing combustion and the diffusion combustion. Alternatively, the combustor may be configured to have the fuel rod for the premixing combustion and the fuel rod for the diffusion combustion independently installed and a nozzle group made up of a plurality of nozzle rods formed.

INDUSTRIAL APPLICABILITY

According to the combustor, the heat-generation fluctuation at the flame position caused by the concentration fluctuation of the downstream side fuel is offset by the heat-generation fluctuation at the flame position caused by the concentration fluctuation of the upstream side fuel. As such, the occurrence of the combustion oscillation can be suppressed. Thereby, the operational tolerance of the gas turbine having the combustor can be increased.

DESCRIPTION OF REFERENCE NUMERALS

1 . . . combustor
2 . . . combustor external cylinder
3 . . . combustor basket
5 . . . pilot nozzle
6 . . . main premixing nozzles
7 . . . compressed air channel
19 . . . first fuel injection peg (upstream side fuel injection peg)
20 . . . second fuel injection peg (downstream side fuel injection peg)
F1 . . . first fuel (upstream side fuel)
F2 . . . second fuel (downstream side fuel)
P . . . flame position (combustion start position)
L . . . distance

The invention claimed is:
1. A combustor comprising:
a combustor external cylinder;
a tubular combustor basket installed in the combustor external cylinder;
a compressed air channel defined between an inner circumferential surface of the combustor external cylinder and an outer circumferential surface of the combustor basket;
a plurality of fuel nozzles installed in the combustor basket, extending approximately in parallel with a central axis of the combustor basket, and injecting fuel for premixing combustion from at least one thereof; and
an airflow introduction part configured to introduce compressed air flowing in a direction along the compressed air channel into the plurality of fuel nozzles so that the compressed air is approximately reversed in the flow direction at an end of the combustor basket, wherein
fuel injection pegs, each of which is made up of an upstream side fuel injection peg injecting upstream side fuel and a downstream side fuel injection peg provided in the downstream side of the upstream side fuel injection peg and injecting downstream side fuel, are installed in the compressed air channel, and
concentration fluctuation of the upstream side fuel caused by pressure fluctuation in the combustor is configured so as to reduce a peak of concentration fluctuation of the downstream side fuel at a combustion start position of the combustor,
wherein, with respect to a direction from the upstream side fuel injection peg to the downstream side fuel injection peg, the downstream side fuel injection peg forms an acute angle with respect to the combustor external cylinder and an obtuse angle with respect to the tubular combustor basket.
2. The combustor according to claim 1, wherein a distance between the upstream side fuel injection peg and the downstream side fuel injection peg is set so that a phase of the concentration fluctuation of the upstream side fuel is opposite to a phase of the concentration fluctuation of the downstream side fuel at a position where the upstream side fuel reaches the downstream side fuel injection peg.

3. The combustor according to claim 1, wherein a concentration of fuel gas mixed by the fuel injection pegs is set so as to be lower than an inflammability limiting concentration.

4. The combustor according to claim 1, wherein the plurality of fuel nozzles include a pilot nozzle installed on a central axis of the combustor basket, and premixing nozzles extending approximately in parallel with the pilot nozzle and installed in the combustor basket at intervals at which central angles thereof are equal to one another.

5. The combustor according to claim 1, wherein the at least one of the plurality of fuel nozzles is provided with both a fuel injection hole for premixing combustion and a fuel injection hole for diffusion combustion.

6. The combustor according to claim 2, wherein a concentration of fuel gas mixed by the fuel injection pegs is set so as to be lower than an inflammability limiting concentration.

7. The combustor according to claim 2, wherein the plurality of fuel nozzles include a pilot nozzle installed on a central axis of the combustor basket, and premixing nozzles extending approximately in parallel with the pilot nozzle and installed in the combustor basket at intervals at which central angles thereof are equal to one another.

8. The combustor according to claim 3, wherein the plurality of fuel nozzles include a pilot nozzle installed on a central axis of the combustor basket, and premixing nozzles extending approximately in parallel with the pilot nozzle and installed in the combustor basket at intervals at which central angles thereof are equal to one another.

9. The combustor according to claim 6, wherein the plurality of fuel nozzles include a pilot nozzle installed on a central axis of the combustor basket, and premixing nozzles extending approximately in parallel with the pilot nozzle and installed in the combustor basket at intervals at which central angles thereof are equal to one another.

10. The combustor according to claim 2, wherein the at least one of the plurality of fuel nozzles is provided with both a fuel injection hole for premixing combustion and a fuel injection hole for diffusion combustion.

11. The combustor according to claim 3, wherein the at least one of the plurality of fuel nozzles is provided with both a fuel injection hole for premixing combustion and a fuel injection hole for diffusion combustion.

12. The combustor according to claim 6, wherein the at least one of the plurality of fuel nozzles is provided with both a fuel injection hole for premixing combustion and a fuel injection hole for diffusion combustion.

\* \* \* \* \*